(12) United States Patent
Wang et al.

(10) Patent No.: US 12,025,723 B2
(45) Date of Patent: Jul. 2, 2024

(54) INTELLIGENT RESCUE METHOD, RESCUE DEVICE, AND VEHICLE

(71) Applicant: Fulian Precision Electronics (Tianjin) Co., LTD., Tianjin (CN)

(72) Inventors: Shih Chun Wang, New Taipei (TW); Shih-Yin Tseng, New Taipei (TW); Ting-Yu Du, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 72 days.

(21) Appl. No.: 17/740,987

(22) Filed: May 10, 2022

(65) Prior Publication Data

US 2023/0130609 A1    Apr. 27, 2023

(30) Foreign Application Priority Data

Oct. 22, 2021   (CN) .......................... 202111232462.2

(51) Int. Cl.
*B64D 47/06*    (2006.01)
*B60Q 1/52*     (2006.01)
(Continued)

(52) U.S. Cl.
CPC .............. *G01S 5/0231* (2013.01); *B60Q 1/52* (2013.01); *B60W 50/0098* (2013.01); *B64C 39/024* (2013.01); *B64D 47/02* (2013.01); *G05D 1/042* (2013.01); *G05D 1/106* (2019.05); *G06T 7/70* (2017.01); *G06V 20/17* (2022.01); *B64U 2101/30* (2023.01); *B64U 2201/10* (2023.01); *G06T 2207/10032* (2013.01); *G06T 2207/30256* (2013.01); *G06T 2207/30261* (2013.01)

(58) Field of Classification Search
CPC .... G01S 5/0231; B60Q 1/52; B60W 50/0098; B64C 39/024; B64D 47/02; G05D 1/042; G05D 1/106; G06T 7/70; G06T 2207/10032; G06V 20/17; B64U 2101/30; B64U 2201/10
USPC ......................................................... 340/981
See application file for complete search history.

(56) References Cited

U.S. PATENT DOCUMENTS 10,155,587 B1 * 12/2018 Tang ........................ B64C 27/08
11,579,633 B1 *  2/2023 Haslam ..................... G05D 1/12
(Continued)

FOREIGN PATENT DOCUMENTS

CN          203111102       8/2013
CN          110799385       2/2020
(Continued)

*Primary Examiner* — Tai T Nguyen
(74) *Attorney, Agent, or Firm* — ScienBiziP, P.C.

(57) ABSTRACT

An intelligent rescue method applied to a vehicle-mounted device and an airborne rescue device to enable semi-automatic warning and rescue of a broken-down, crashed, drowned, or stranded vehicle, enables communication between the vehicle-mounted device and the rescue device. The vehicle-mounted device determines by sensors a type of emergency of a vehicle, and performs a first assistance action and sends the rescue device a distress signal corresponding to the type of the emergency of the vehicle. The rescue device receives the distress signal and takes off from an initial position of the vehicle to a target position in response to the distress signal. Once the rescue device reaches the target position, the rescue device performs a second action for assistance.

17 Claims, 6 Drawing Sheets

(51) Int. Cl.
  *B60W 50/00* (2006.01)
  *B64C 39/02* (2023.01)
  *B64D 47/02* (2006.01)
  *G01S 5/02* (2010.01)
  *G05D 1/00* (2006.01)
  *G06T 7/70* (2017.01)
  *G06V 20/17* (2022.01)
  *B64U 101/30* (2023.01)

(56) References Cited

U.S. PATENT DOCUMENTS

| | | | | |
|---|---|---|---|---|
| 2016/0272317 | A1* | 9/2016 | Cho | B64U 50/38 |
| 2018/0184051 | A1* | 6/2018 | Watanabe | H04N 23/90 |
| 2018/0327091 | A1* | 11/2018 | Burks | H04W 4/44 |
| 2019/0061663 | A1* | 2/2019 | Benmimoun | B60R 21/00 |
| 2020/0346751 | A1* | 11/2020 | Horelik | B64U 10/13 |
| 2023/0066525 | A1* | 3/2023 | Cabanas | H04W 4/029 |

FOREIGN PATENT DOCUMENTS

| | | |
|---|---|---|
| CN | 111429752 | 7/2020 |
| KR | 20170055178 | 5/2017 |
| KR | 20180051908 | 5/2018 |

* cited by examiner

INTELLIGENT RESCUE METHOD, RESCUE DEVICE, AND VEHICLE

FIELD

The present disclosure relates to rescue technologies, in particular to an intelligent rescue method, a rescue device, and a vehicle.

BACKGROUND

As roads become busier, a probability of a vehicle encountering an accident is also increasing year by year. In particular, a vehicle crashed or stranded in a mountainous region or a vehicle caught up in a flood causes great difficulties to rescuers, and in addition, the safety of people in such vehicles cannot be guaranteed.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
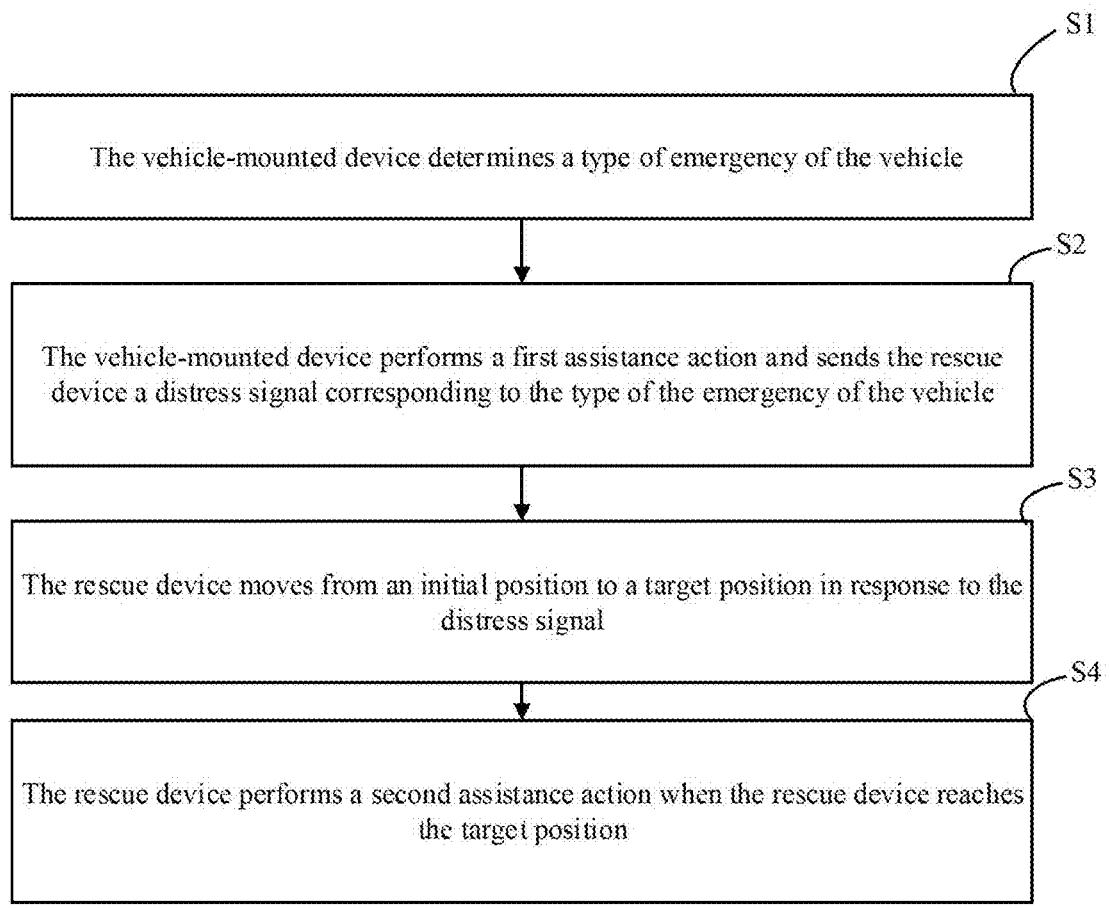
FIG. 1 is a flow chart of an intelligent rescue method in an embodiment according to the present disclosure.

FIG. 1 is a flowchart of an intelligent rescue method according to a preferred embodiment of the present disclosure. In this embodiment, the intelligent rescue method can be applied to a vehicle (for example, a vehicle 1 shown in FIG. 4) which is installed with a vehicle-mounted device (for example, a vehicle-mounted device 2 shown in FIG. 2) and a rescue device (for example, a rescue device 3 shown in FIG. 3), the vehicle-mounted device is in communication with the rescue device.

At block S1, the vehicle-mounted device 2 determines a type of emergency of the vehicle 1.

In one embodiment, the vehicle-mounted device 2 can be fixedly or movably installed on the vehicle 1.

In one embodiment, a plurality of sensor devices (such as sensor devices 10 shown in FIG. 4) are installed in the vehicle 1, and the plurality of sensor devices are used to obtain driving data (for example, a range of vibration, a driving speed, etc.) of the vehicle 1, each of the plurality of sensor devices is in communication with the vehicle-mounted device 2 (for example, each sensor device is in communication with the vehicle-mounted device 2 via a sensor network).

For example, the plurality of sensor devices may include one or more vibration sensors mounted on a body of the vehicle 1, one or more wheel speed sensors, and one or more pressure sensors mounted on wheels of the vehicle 1. The vibration sensor is used to sense the range of vibration of the vehicle 1, the wheel speed sensor can sense the driving speed of the vehicle 1, the pressure sensor can sense a contact between the vehicle 1 and a ground and also sense a water level at a preset position (for example, a position of an air intake) of the vehicle 1.

Figure 5:
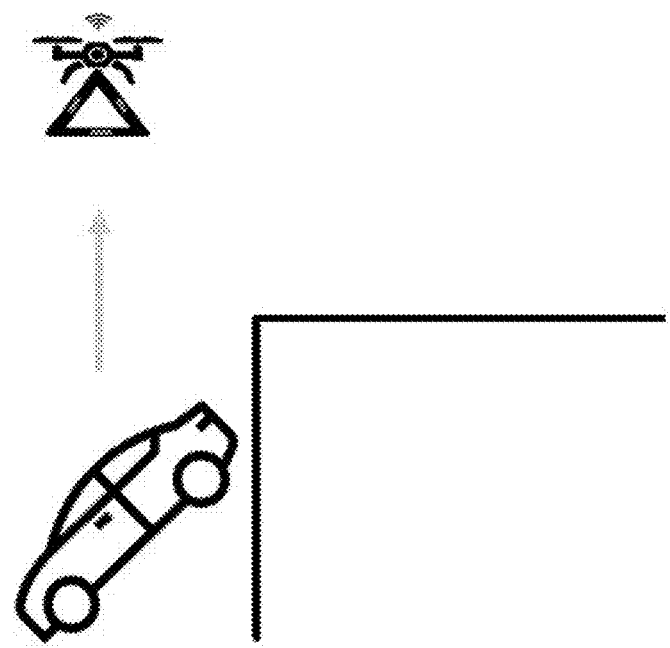
FIG. 5 illustrates an example of a target location of the rescue device when the vehicle is in a falling accident.
Figure 6:
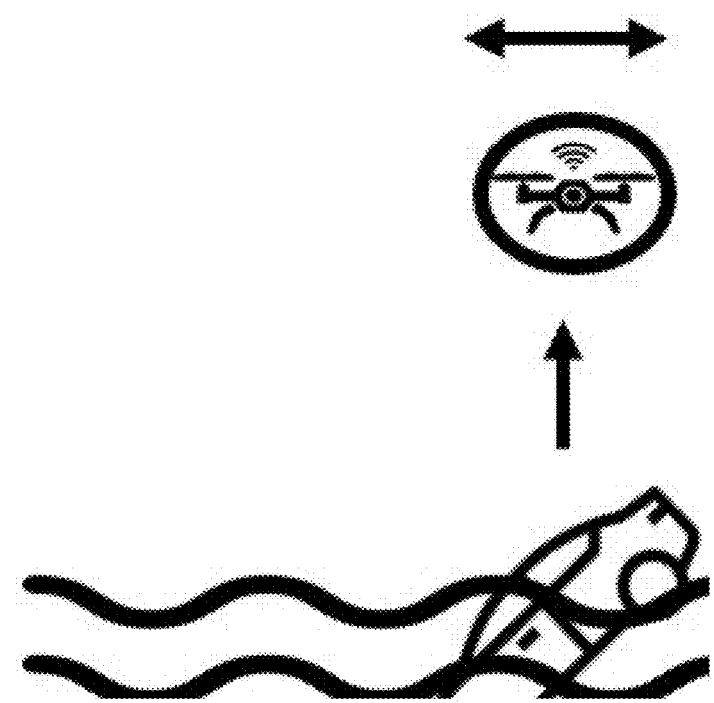
FIG. 6 illustrates an example of a target location of the rescue device when the vehicle is in a wading accident.

In one embodiment, the determining of the type of emergency of the vehicle 1 includes:

Acquiring the driving data of the vehicle 1 from the plurality of sensor devices 10; and Detecting the type of emergency of the vehicle 1 according to the driving data, including:

When the driving data indicates that the range of vibration of the vehicle 1 exceeds a preset threshold of vibration (for example, 15 mm/s), and the driving speed of the vehicle 1 gradually decreases, determining that the type of emergency of the vehicle 1 is a first type (named as "plane accident") when the driving speed of the vehicle 1 is zero and a time length of the driving speed of the vehicle 1 is zero for more than a preset first duration (for example, 1 minute);

When the driving data indicates that a time length of the vehicle 1 not contacting the ground for a preset second duration (for example, 1 minute), and the driving speed of the vehicle 1 gradually decreases, determining that the type of emergency of the vehicle 1 is a second type (named as "fall accident") when the driving speed of the vehicle 1 is zero and a time length of the driving speed of the vehicle 1 being zero is for more than the preset first duration (for example, as shown in FIG. 5);

When the driving data indicates that the water level of the preset position of the vehicle 1 exceeds a preset threshold of water level (for example, 2 cm), determining that the type of emergency of the vehicle 1 is a third type (named as "wading accident"), for example, as shown in FIG. 6.

At block S2, the vehicle-mounted device 2 performs a first assistance action and sends the rescue device 3 a distress signal corresponding to the type of the emergency of the vehicle 1.

Figure 3:
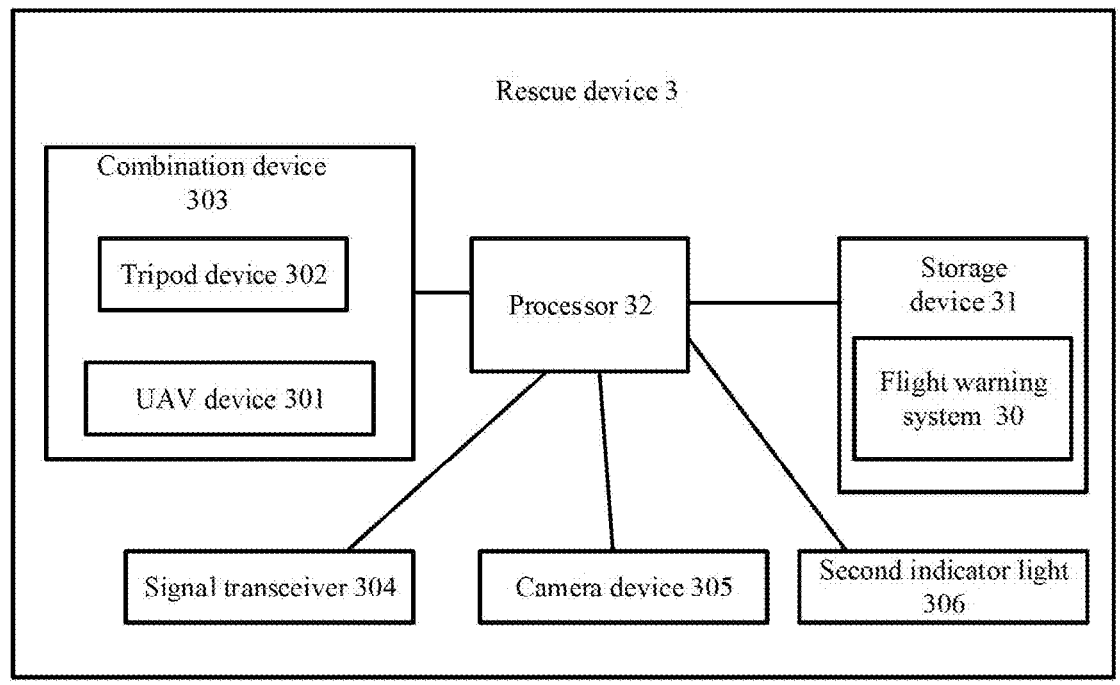
FIG. 3 is a structural diagram of a rescue device in an embodiment according to the present disclosure
Figure 7:
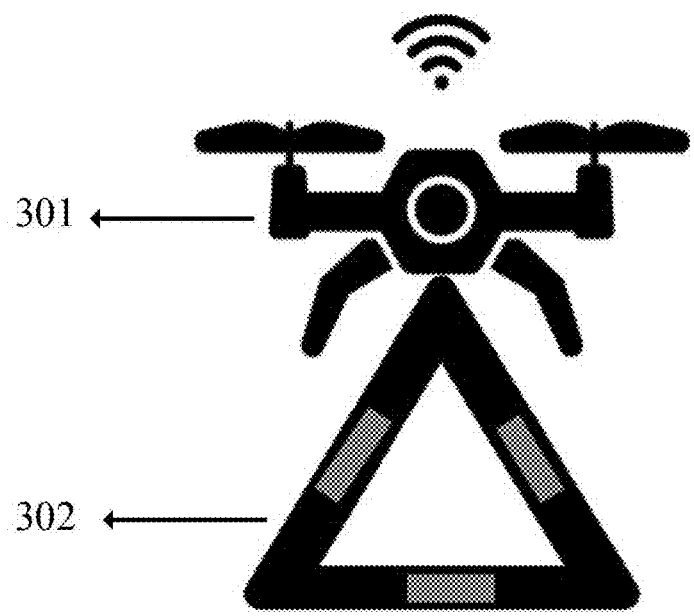
FIG. 7 is a schematic diagram of a combination device in an embodiment according to the present disclosure.

In one embodiment, the rescue device 3 can be movably installed in the vehicle 1, as shown in FIG. 3 and FIG. 7, the rescue device 3 can include a combination device 303, which includes an intelligent UAV (Unmanned Aerial Vehicle) device 301 and a tripod device 302. A flight warning system 30 is installed in the rescue device 3.

In other embodiments, the flight warning system 30 may be installed in the intelligent UAV device 301.

In one embodiment, the rescue device 3 may be mounted on a housing of the vehicle 1, e.g., a top of the vehicle 1 through a switch device 11. When the rescue device 3 is installed inside a top housing of the vehicle 1, the switch device 11 can be a closed protection device. When the rescue device 3 is installed outside the top housing of the vehicle 1, the switch device 11 can be a combination device. The switch device 11 is used to fix the rescue device 3. The switch device 11 includes a brake. The vehicle-mounted device 2 is electrically connected with the switch device 11. The vehicle-mounted device 2 opens the switch device 11 by controlling the brake, so that the rescue device 3 can take off from the vehicle 1.

Figure 4:
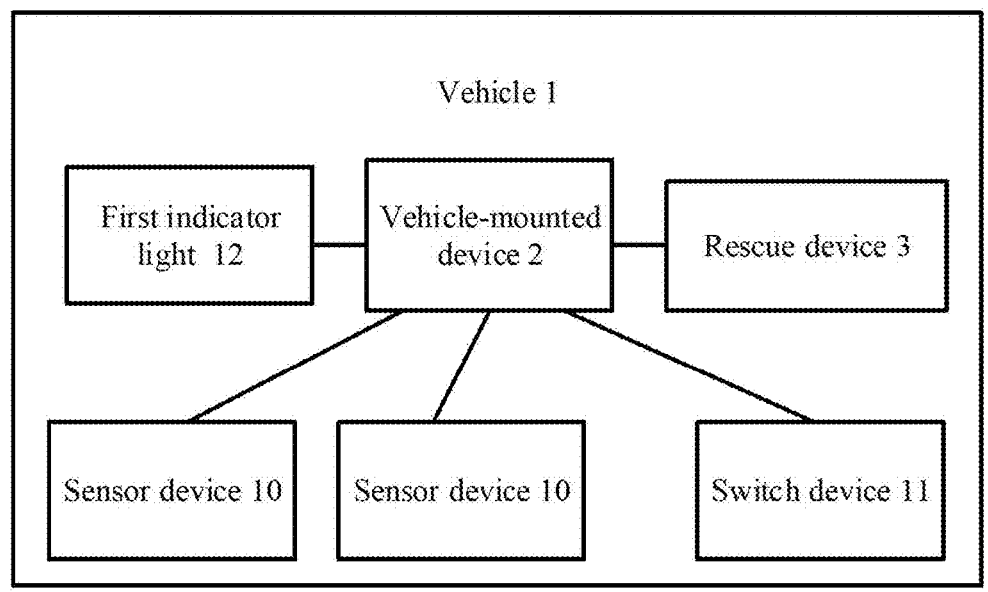
FIG. 4 is a structural diagram of a vehicle in an embodiment according to the present disclosure.

In an embodiment, the performing of the first assistance action includes:

Turning on a first indicator light (such as a first indicator light 12 which acts as a fault light of the vehicle 1 shown in FIG. 4) installed on the vehicle 1, and turning on the switch device 11 so that the rescue device 3 can take off from the vehicle 1.

The sending the rescue device 3 the distress signal corresponding to the type of the emergency of the vehicle 1 includes:

Sending a first signal (named as "plane deployment signal") to the rescue device 3 when the type of the emergency of the vehicle 1 is the plane accident;

Sending a second signal (named as "fall deployment signal") to the rescue device 3 when the type of the emergency of the vehicle 1 is the fall accident; and Sending a third signal (named as "wading deployment signal") to the rescue device 3 when the type of the emergency of the vehicle 1 is the wading accident.

It should be noted that the vehicle-mounted device 2 can further include a manual manipulation device 201 (for example, the manual manipulation device 201 may be an operating handle having a display device, buttons, and a rocker for adjusting directions). The vehicle-mounted device 2 can respond to user's operation (for example, an operation of a user clicks a button corresponding to the first assistance action), by performing the first assistance action and sending the distress signal corresponding to the type of the emergency of the vehicle 1 to the rescue device 3.

At block S3, the rescue device 3 moves from an initial position to a target position in response to the distress signal.

In one embodiment, the rescue device 3 is equipped with a signal transceiver 304, and the signal transceiver 304 can receive satellite signals, the rescue device 3 can determine received signal strength indicator (RSSI) of the satellite signals.

In one embodiment, a camera device 305 is installed on the rescue device 3, the camera device 305 can capture images of an environment around the vehicle 1 and the rescue device 3 (hereinafter named as "environmental images"). The rescue device 3 can acquire the environmental images using the camera device 305 and save the environmental images. The rescue device 3 can perform identification and calculation based on the environmental images, for example, the rescue device 3 can identify markings on a road surface (hereinafter named as "road markings") where the vehicle 1 is located, and can determine a driving path of the vehicle 1 based on the environmental images.

In other embodiments, the signal transceiver 304 and the camera device 305 may be installed on the intelligent UAV device 301.

In one embodiment, the initial position refers to a position where the rescue device 3 is installed on the vehicle 1.

Figure 8:
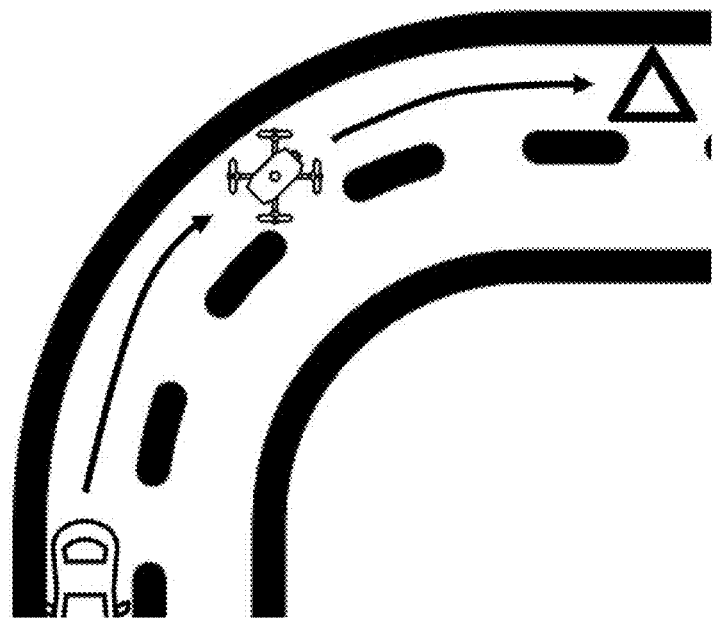
FIG. 8 illustrates an example of the combination device flying in an opposite direction along a road marking when the vehicle is in a plane accident.
Figure 9:
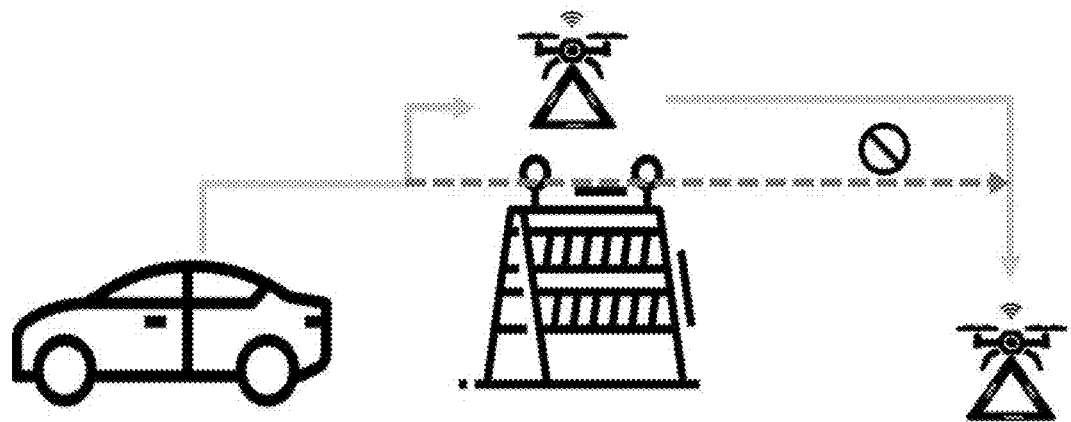
FIG. 9 illustrates an example of adjusting a flight height and flight angle of the combination device to avoid an obstacle when there is obstacle on a driving path when the vehicle is in a plane accident.
Figure 10:
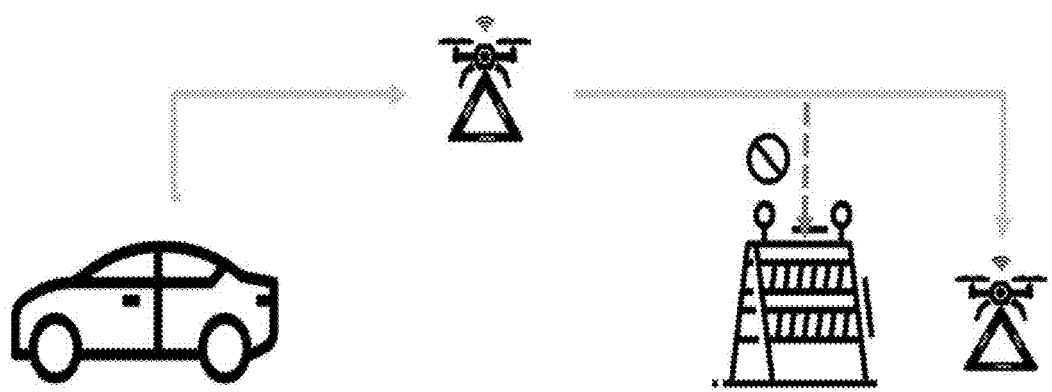
FIG. 10 illustrates an example of flying to an updated designated position when there is obstacle at a designated position when the vehicle is in a plane accident.

In one embodiment, the rescue device 3 receives the distress signal. When the distress signal is the plane deployment signal, the rescue device 3 further performs the following actions:

In response to the plane deployment signal, controlling the combination device 303 to fly to a preset height above the vehicle 1 (for example, a height where the RSSI is greater than −60 dBm);

Determining whether there are road markings on the road on which the vehicle 1 is located based on a preset algorithm according to the environmental image, the preset algorithm includes an image feature extraction algorithm (for example, a directional grayscale histogram algorithm) and an image recognition algorithm (such as a feature detection and feature matching algorithm);

When it is determined that the road on which the vehicle 1 is located has no road markings, determining a reverse direction (hereinafter named as "first reverse direction") and a driving path of the vehicle 1 according to the driving data, and controlling the combination device 303 to fly in the first reverse direction along the driving path; or When it is determined that there is a road marking on the road where the vehicle 1 is located, determining a reverse direction (hereinafter named as "second reverse direction") according to the driving data and setting the road marking as the driving path, and controlling the combination device 303 to fly in the second reverse direction along the driving path (for example, as shown in FIG. 8);

Based on the preset algorithm, determining whether there are obstacles (such as rocks, etc.) on the driving path according to the environmental image, wherein the preset algorithm further includes a bug algorithm and an artificial potential field method;

When it is determined that there are no obstacles on the driving path, controlling the combination device 303 to fly to a designated position, the designated position includes a position where the RSSI of the satellite signal received by the signal transceiver 304 is greater than −60 dBm; or When it is determined that there is an obstacle on the driving path, avoiding the obstacle by adjusting a flight altitude, a flight latitude longitude, and/or a flight angle of the combination device 303 until the combination device 303 flies to the designated position (for example, as shown in FIG. 9, controlling the combination device 303 to fly higher than the obstacle or bypass the obstacle);

Determining the target position by making at least one judgment on the designated position according to the environmental image, and controlling the combination device 303 to fly to the target position, wherein each of the at least one judgment made on the designated position includes:

Determining whether there is an obstacle at the designated position;

If there is no obstacle at the designated position, setting the designated position as the target position; or If there is an obstacle at the designated position, updating the designated position (for example, updating the designated position to be a position at which the RSSI is greater than −60 dBm and is nearest to the designated position) and controlling the combination device 303 to fly to the updated designated position (for example, as shown in FIG. 10), and making a next judgment on the updated designated position.

In one embodiment, the target position is a position without obstacles, and is clear for the tripod device 302 to drop.

In one embodiment, the determining of whether there is the road marking on the road where the vehicle 1 is located according to the environmental image includes: extracting features in the environmental image using image feature extraction algorithm (for example, a direction grayscale histogram algorithm), and determining whether the features contain the road marking using image recognition technology (such as feature detection and feature matching algorithm).

In one embodiment, the determining of the first reverse direction and the driving path of the vehicle 1 according to the driving data includes: determining a direction of a front of the vehicle 1 (hereinafter named as "first front direction") using the image feature extraction algorithm and the image recognition technology, and determining a direction reverse to the first front direction as the first reverse direction; determining a road edge of the first reverse direction using the image feature extraction algorithm and the image recognition technology or determining a driving track of tires of the vehicle 1 using the image feature extraction algorithm and the image recognition technology; and determining the driving path of the vehicle 1 according to the road edge of the first reverse direction or determining the driving path of the vehicle 1 according to the driving track of tires of the vehicle 1.

The determining of the second reverse direction according to the driving data includes: determining a direction of the front of the vehicle 1 (hereinafter named as "second front direction") by using the image feature extraction algorithm and the image recognition technology, and determining a direction reverse to the second front direction as the second reverse direction.

The determining as to whether there is the obstacle on the driving path according to the environmental image includes: determining whether there is the obstacle on the driving path based on the preset algorithm, wherein the preset algorithm includes a bug algorithm. Bug1 algorithm, Bug2 algorithm, a potential field method, a vector field histogram, a neural network, a fuzzy logic, a dijkstra algorithm, etc.

In one embodiment, the rescue device 3 receives the distress signal, and when the received distress signal is the fall deployment signal, the rescue device 3 sets a position at a preset height (for example, a position at a preset height where the RSSI is greater than −60 dBm) above the vehicle 1 as the target position, and controls the combination device 303 to fly to the target position (for example, as shown in FIG. 5).

In one embodiment, the rescue device 3 receives the distress signal, and when the received distress signal is the wading deployment signal, the rescue device 3 locates a position of the vehicle 1 in response to the wading deployment signal, and sets the position of the preset height above the vehicle 1 as the target position, and controls the combination device 303 to follow the position of the vehicle 1 and fly at the preset height (for example, as shown in FIG. 6). Since the position of the vehicle 1 in the water may change in real time, the rescue device 3 can fly according to the real-time position of the vehicle 1.

The parameters such as the flight height and the flight angle described in the above-mentioned embodiments of the present disclosure can be preset or adjusted, and these parameters can be stored or embedded in the rescue device 3.

It should be noted that the manual manipulation device 201 can display the environmental image, and can also control the rescue device 3 to move from the initial position to the target position in response to the user's operation (e.g., the operation that the user operates a joystick of the manual manipulation device 201).

At block S4, when the rescue device 3 reaches the target position, the rescue device 3 performs a second assistance action.

In one embodiment, the performing of the second assistance action includes:

Turning on a second indicator light 306 installed on the rescue device 3;

Detecting location information of the rescue device 3; and

Controlling the signal transceiver 304 to transmit a distress signal to the global satellite search and rescue system, the distress signal includes the location information.

In addition, the rescue device 3 can capture a plurality of images or videos when the rescue device 3 leaves the vehicle 1, and the rescue device 3 can simultaneously send the captured images or videos to the global satellite search and rescue system together with the distress signal.

In one embodiment, after performing the second assistance action, the rescue device 3 returns to the initial position.

It should be noted that, after performing the second assistance action, the rescue device 3 can return to the initial position along the driving path obtained in block S3. The rescue device 3 also can move from the target position to the initial position in response to the user's control operation through the manual manipulation device 201.

In addition, in other embodiments, if a current state of the vehicle 1 is not suitable for the rescue device 3 to return to the initial position, for example, when the vehicle 1 is in the wading accident, or an equipment or facilities that loads the rescue device 3 has been damaged, the rescue device 3 is not able to return to the initial position, the rescue device 3 can fly to a nearby position of the vehicle 1 according to a preset backup solution. For example, in the backup solution, information such as distance (for example, not more than 200 meters away from the vehicle 1) or azimuth can be preset for the rescue device 3.

FIG. 1 describes in detail the intelligent rescue method of the present disclosure. Hardware architecture that implements the intelligent rescue method is described in conjunction with FIG. 2 and FIG. 3.

It should be understood that the described embodiments are for illustrative purposes only, and are not limited by this structure in the scope of the claims.

Figure 2:
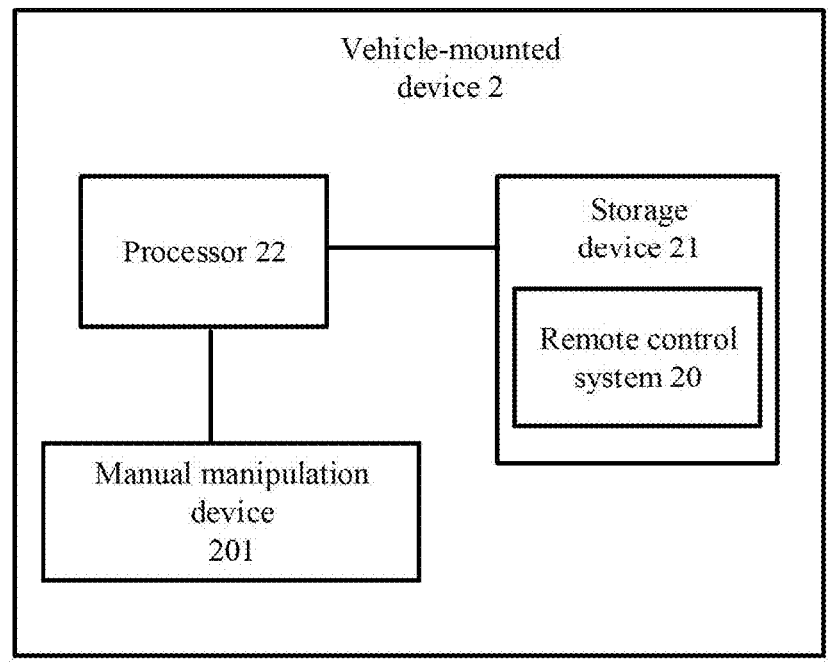
FIG. 2 is a structural diagram of a vehicle-mounted device in an embodiment according to the present disclosure.

FIG. 2 is a block diagram of a vehicle-mounted device provided by the present disclosure. The vehicle-mounted device 2 may include a storage device 21 and at least one processor 22.

It should be understood by those skilled in the art that the structure of the vehicle-mounted device 3 shown in FIG. 2 does not constitute a limitation of the embodiment of the present disclosure. The vehicle-mounted device 3 may further include other hardware or software, or the vehicle-mounted device 2 may have different component arrangements.

In at least one embodiment, the vehicle-mounted device 2 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the vehicle-mounted device 2 is merely an example, and other existing or future electronic products may be included in the scope of the present disclosure, and are included in the reference.

In some embodiments, the storage device 21 can be used to store program codes of computer readable programs and various data, such as the remote control system 20 installed in the vehicle-mounted device 2, and automatically access the programs or data with high speed during the running of the vehicle-mounted device 2. The storage device 21 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the vehicle-mounted device 2 that can be used to carry or store data.

In some embodiments, the at least one processor 22 may be composed of an integrated circuit, for example, may be composed of a single packaged integrated circuit, or multiple integrated circuits of same function or different functions. The at least one processor 22 can include one or more central processing units (CPU), a microprocessor, a digital processing chip, a graphics processor, and various control chips. The at least one processor 22 is a control unit of the vehicle-mounted device 2, which connects various components of the vehicle-mounted device 2 using various interfaces and lines. By running or executing a computer program or modules stored in the storage device 21, and by invoking the data stored in the storage device 21, the at least one processor 22 can perform various functions of the vehicle-mounted device 2 and process data of the vehicle-mounted device 2. For example, the processor 22 may perform the intelligent rescue function shown in FIG. 1.

In some embodiments, the remote control system 20 operates in vehicle-mounted device 2. The remote control system 20 may include a plurality of functional modules composed of program code segments. The program code of each program segment in the remote control system 20 can be stored in storage device 21 of the vehicle-mounted device 2 and executed by at least one processor 22 to achieve blocks S1-S2 as shown in FIG. 1.

In this embodiment, the remote control system 20 can be divided into a plurality of functional modules. The module means a series of computer program segments that can be executed by at least one processor 22 and perform fixed functions and are stored in storage device 21.

Although not shown, the vehicle-mounted device 2 may further include a power supply (such as a battery) for powering various components. Preferably, the power supply may be logically connected to the at least one processor 22 through a power management device, thereby, the power management device manages functions such as charging, discharging, and power management. The power supply may include one or more DC or AC power sources, a recharging device, a power failure detection circuit, a power converter or inverter, a power status indicator, and the like. The vehicle-mounted device 2 may further include various sensors, such as a BLUETOOTH module, a WI-FI module, and the like, and details are not described herein.

FIG. 3 is a block diagram of a rescue device provided by the present disclosure. The rescue device 3 may include a storage device 21 and at least one processor 22. It should be understood by those skilled in the art that the structure of the rescue device 3 shown in FIG. 3 does not constitute a limitation of the embodiment of the present disclosure. The rescue device 3 may further include other hardware or software, or the rescue device 3 may have different component arrangements.

In at least one embodiment, the rescue device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the rescue device 3 is merely an example, and other existing or future electronic products may be included in the scope of the present disclosure, and are included in the reference.

In some embodiments, the storage device 31 can be used to store program codes of computer readable programs and various data, such as the flight warning system 30 installed in the rescue device 3, and automatically access the programs or data with high speed during the running of the rescue device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the rescue device 3 that can be used to carry or store data.

In some embodiments, the at least one processor 32 may be composed of an integrated circuit, for example, may be composed of a single-packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the rescue device 3, which connects various components of the rescue device 3 using various interfaces and lines. By running or executing a computer program or modules stored in the storage device 31, and by invoking the data stored in the storage device 31, the at least one processor 32 can perform various functions of the rescue device 3 and process data of the rescue device 3. For example, the processor 32 may perform the intelligent rescue function shown in FIG. 1.

In some embodiments, the flight warning system 30 operates in rescue device 3. The flight warning system 30 may include a plurality of functional modules composed of program code segments. The program code of each program segment in the flight warning system 30 can be stored in storage device 31 of the rescue device 3 and executed by at least one processor 32 to achieve blocks S3-S4 as shown in FIG. 1.

In this embodiment, the flight warning system 30 can be divided into a plurality of functional modules. The module means a series of computer program segments that can be executed by at least one processor 32 and perform fixed functions and are stored in storage device 31.

Although not shown, the rescue device 3 may further include a power supply (such as a battery) for powering various components. Preferably, the power supply may be logically connected to the at least one processor 32 through a power management device, thereby, the power management device manages functions such as charging, discharging, and power management. The power supply may include one or more a DC or AC power source, a recharging device, a power failure detection circuit, a power converter or inverter, a power status indicator, and the like. The rescue device 3 may further include various sensors, such as a BLUETOOTH module, a WI-FI module, and the like, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An intelligent rescue method applied to a vehicle-mounted device and a rescue device, the vehicle-mounted device being in communication with the rescue device, the intelligent rescue method comprising:
   determining, at the vehicle-mounted device, a type of emergency of a vehicle, comprising: acquiring driving data of the vehicle; and detecting the type of emergency of the vehicle according to the driving data, comprising: in response that the driving data indicating that a range of vibration of the vehicle exceeds a preset threshold of vibration, and a driving speed of the vehicle gradually decreases, determining that the type of emergency of the vehicle is a plane accident when the driving speed of the vehicle is zero and a time length of the driving speed of the vehicle being zero for more than a preset first duration; in response that the driving data indicating that a time length of the vehicle has not contact a ground for a preset second duration, and the driving speed of the vehicle gradually decreases, determining that the type of emergency of the vehicle is a fall accident when the driving speed of the vehicle is zero and a time length of the driving speed of the vehicle being zero for more than the preset first duration; and determining that the type of emergency of the vehicle is a wading accident in response that the driving data indicating that a water level of a preset position of the vehicle exceeds a preset threshold of water level;
   performing, at the vehicle-mounted device, a first assistance action and sending the rescue device a distress signal corresponding to the type of the emergency of the vehicle, wherein the first assistance action comprises: turning on a switch device installed on the vehicle to enable the rescue device to take off from the vehicle;
   receiving, at the rescue device, the distress signal, and moving from an initial position to a target position in response to the distress signal; and
   performing, at the rescue device, a second assistance action when the rescue device reaches the target position.

2. The intelligent rescue method as claimed in claim 1, wherein the first assistance action further comprises:
   turning on a first indicator light installed on the vehicle.

3. The intelligent rescue method as claimed in claim 2, wherein sending the rescue device the distress signal corresponding to the type of the emergency of the vehicle comprises:
   sending a plane deployment signal to the rescue device when the type of the emergency of the vehicle is the plane accident;
   sending a fall deployment signal to the rescue device when the type of the emergency of the vehicle is the fall accident; and
   sending a wading deployment signal to the rescue device when the type of the emergency of the vehicle is the wading accident.

4. The intelligent rescue method as claimed in claim 3, wherein in response that the distress signal received by the rescue device is the plane deployment signal, the rescue device further performs the following actions:
   controlling a combination device to fly to a preset height above the vehicle in response to the plane deployment signal;
   determining whether there are road markings on a road on which the vehicle is located based on a preset algorithm according to an environmental image;

in response that the road on which the vehicle is located has no road markings, determining a first reverse direction and a driving path of the vehicle according to the driving data, and controlling the combination device to fly in the first reverse direction along the driving path; or in response that there is a road marking on the road where the vehicle is located, determining a second reverse direction according to the driving data and setting the road marking as the driving path, and controlling the combination device to fly in the second reverse direction along the driving path;

determining whether there are obstacles on the driving path;

controlling the combination device to fly to a designated position when there is no obstacles on the driving path; or in response that there is an obstacle on the driving path, avoiding the obstacle by adjusting a flight altitude, a flight latitude longitude, and/or a flight angle of the combination device until the combination device flies to the designated position; and determining the target position by making at least one judgment on the designated position according to the environmental image, and controlling the combination device to fly to the target position.

5. The intelligent rescue method as claimed in claim 4, wherein each of the at least one judgment made on the designated position comprises:

determining whether there is an obstacle at the designated position;

setting the designated position as the target position in response that there is no obstacle at the designated position; or updating the designated position in response that there is an obstacle at the designated position, and controlling the combination device to fly to the updated designated position, and making a next judgment on the updated designated position.

6. The intelligent rescue method as claimed in claim 3, wherein in response that the distress signal is the fall deployment signal, the rescue device sets a position at a preset height above the vehicle as the target position, and controls the combination device to fly to the target position.

7. The intelligent rescue method as claimed in claim 3, wherein in response that the distress signal is the wading deployment signal, the rescue device locates a position of the vehicle in response to the wading deployment signal, and sets the position of the preset height above the vehicle as the target position, and controls the combination device to follow the position of the vehicle and fly at the preset height.

8. The intelligent rescue method as claimed in claim 1, wherein performing the second assistance action comprises:

turning on a second indicator light installed on the rescue device;

detecting location information of the rescue device; and controlling a signal transceiver to transmit a distress signal to the global satellite search and rescue system, the distress signal comprising the location information.

9. The intelligent rescue method as claimed in claim 8, wherein after performing the second assistance action, the rescue device returns to the initial position.

10. The intelligent rescue method as claimed in claim 1, further comprising:

performing, at the vehicle-mounted device, the first assistance action in response to user operation.

11. A rescue device comprising:

a storage device;

at least one processor; and the storage device storing one or more programs, which when executed by the at least one processor, cause the at least one processor to:

receive a distress signal from a vehicle-mounted device, and in response to the distress signal, move from an initial position to a target position;

perform a second assistance action when the rescue device reaches the target position; and in response that the second assistance action is finished, move from the target position to the initial position;

wherein in response that the distress signal is a plane deployment signal, the rescue device further performs the following actions:

controlling a combination device to fly to a preset height above the vehicle in response to the plane deployment signal;

determining whether there are road markings on a road on which the vehicle is located based on a preset algorithm according to an environmental image;

in response that the road on which the vehicle is located has no road markings, determining a first reverse direction and a driving path of the vehicle according to the driving data, and controlling the combination device to fly in the first reverse direction along the driving path; or in response that there is a road marking on the road where the vehicle is located, determining a second reverse direction according to the driving data and setting the road marking as the driving path, and controlling the combination device to fly in the second reverse direction along the driving path;

determining whether there are obstacles on the driving path;

controlling the combination device to fly to a designated position when there is no obstacles on the driving path; or in response that there is an obstacle on the driving path, avoiding the obstacle by adjusting a flight altitude, a flight latitude longitude, and/or a flight angle of the combination device until the combination device flies to the designated position; and determining the target position by making at least one judgment on the designated position according to the environmental image, and controlling the combination device to fly to the target position.

12. The rescue device as claimed in claim 11, wherein each of the at least one judgment made on the designated position comprises:

determining whether there is an obstacle at the designated position;

setting the designated position as the target position in response that there is no obstacle at the designated position; or updating the designated position in response that there is an obstacle at the designated position, and controlling the combination device to fly to the updated designated position, and making a next judgment on the updated designated position.

13. The rescue device as claimed in claim 11, wherein in response that the distress signal is a fall deployment signal, the rescue device sets a position at a preset height above the vehicle as the target position, and controls the combination device to fly to the target position.

14. The rescue device as claimed in claim 11, wherein in response that the distress signal is a wading deployment signal, the rescue device locates a position of the vehicle in response to the wading deployment signal, and sets the position of the preset height above the vehicle as the target position, and controls the combination device to follow the position of the vehicle and fly at the preset height.

15. The rescue device as claimed in claim 11, wherein performing the second assistance action comprises:
   turning on a second indicator light installed on the rescue device;
   detecting location information of the rescue device; and
   controlling a signal transceiver to transmit a distress signal to the global satellite search and rescue system, the distress signal comprising the location information.

16. A vehicle comprising a vehicle-mounted device and a rescue device, the vehicle-mounted device being in communication with the rescue device,
   wherein the vehicle-mounted device determines a type of emergency of a vehicle by acquiring driving data of the vehicle; and detecting the type of emergency of the vehicle according to the driving data, comprising: in response that the driving data indicating that a range of vibration of the vehicle exceeds a preset threshold of vibration, and a driving speed of the vehicle gradually decreases, determining that the type of emergency of the vehicle is a plane accident when the driving speed of the vehicle is zero and a time length of the driving speed of the vehicle being zero for more than a preset first duration; in response that the driving data indicating that a time length of the vehicle has not contact a ground for a preset second duration, and the driving speed of the vehicle gradually decreases, determining that the type of emergency of the vehicle is a fall accident when the driving speed of the vehicle is zero and a time length of the driving speed of the vehicle being zero for more than the preset first duration; and determining that the type of emergency of the vehicle is a wading accident in response that the driving data indicating that a water level of a preset position of the vehicle exceeds a preset threshold of water level;
   the vehicle-mounted device performs a first assistance action and sends the rescue device a distress signal corresponding to the type of the emergency of the vehicle, wherein the first assistance action comprises: turning on a switch device installed on the vehicle to enable the rescue device to take off from the vehicle;
   the rescue device moves from an initial position to a target position in response to the distress signal; and
   the rescue device performs a second assistance action when the rescue device reaches the target position.

17. The vehicle as claimed in claim 16, wherein the first assistance action further comprises:
   turning on a first indicator light installed on the vehicle.

* * * * *